(12) United States Patent
Kim et al.

(10) Patent No.: US 12,554,897 B2
(45) Date of Patent: Feb. 17, 2026

(54) ELECTRONIC DEVICE

(71) Applicant: SAMSUNG ELECTRONICS CO., LTD., Suwon-si (KR)

(72) Inventors: Sunghyun Kim, Anyang-si (KR); Keunyoung Park, Seongnam-si (KR); Bogyeong Kang, Hwaseong-si (KR); Dongjin Park, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 843 days.

(21) Appl. No.: 17/746,049

(22) Filed: May 17, 2022

(65) Prior Publication Data

US 2023/0059382 A1 Feb. 23, 2023

(30) Foreign Application Priority Data

Aug. 23, 2021 (KR) .................. 10-2021-0111200

(51) Int. Cl.
*G06F 21/81* (2013.01)
*G06F 12/14* (2006.01)
*G06F 21/72* (2013.01)
*G06F 21/74* (2013.01)

(52) U.S. Cl.
CPC .......... *G06F 21/81* (2013.01); *G06F 12/1408* (2013.01); *G06F 21/72* (2013.01); *G06F 21/74* (2013.01)

(58) Field of Classification Search
CPC .... G06F 1/3203; G06F 1/3275; G06F 1/3293; G06F 21/81; G06F 21/72; G06F 21/74; G06F 21/79; G06F 12/1408; G06F 15/7807; Y02D 10/00
See application file for complete search history.

(56) References Cited

U.S. PATENT DOCUMENTS

| 8,184,812 | B2 | 5/2012 | Margolis et al. |
| 8,190,931 | B2 | 5/2012 | Laurenti et al. |
| 8,572,416 | B2 | 10/2013 | Sutardja et al. |
| 8,775,757 | B2 | 7/2014 | Polzin et al. |
| 8,832,465 | B2 | 9/2014 | Gulati et al. |
| 8,873,747 | B2 | 10/2014 | Polzin et al. |

(Continued)

FOREIGN PATENT DOCUMENTS

| KR | 10-2020-0128825 A | 11/2020 |
| KR | 10-2020-0129776 A | 11/2020 |

(Continued)

*Primary Examiner* — Matthew T Henning
(74) *Attorney, Agent, or Firm* — Muir Patent Law, PLLC

(57) ABSTRACT

An electronic device which operates in a normal mode or a low power mode includes a system on chip (SOC), a first non-volatile memory (NVM), and a security device including a second NVM and a memory processor. The first NVM includes a security region and a non-security region. The SOC includes a main processor a memory controller and a security processor connected to the main processor and the memory controller. The security processor generates a write request signal and first security data. In the normal mode, the security processor stores the first security data in the security region of the first NVM in response to the main processor of the SOC being activated and stores the first security data in the second NVM in response to the memory processor of the security device being activated.

20 Claims, 12 Drawing Sheets

(56) References Cited

U.S. PATENT DOCUMENTS

| | | |
|---|---|---|
| 8,887,257 B2 | 11/2014 | Haggerty et al. |
| 9,043,632 B2 | 5/2015 | Machnicki et al. |
| 9,047,471 B2 | 6/2015 | Polzin et al. |
| 9,202,061 B1 | 12/2015 | Polzin et al. |
| 9,239,920 B2 | 1/2016 | Ashkenazi |
| 9,419,794 B2 | 8/2016 | Polzin et al. |
| 9,443,107 B2 | 9/2016 | Dent |
| 9,460,312 B2 | 10/2016 | Brumley et al. |
| 9,471,793 B2 | 10/2016 | Gail et al. |
| 9,477,294 B2 | 10/2016 | Nishijima et al. |
| 9,479,331 B2 | 10/2016 | de Cesare et al. |
| 9,547,361 B2 | 1/2017 | Taha et al. |
| 9,547,778 B1 | 1/2017 | Paaske et al. |
| 9,621,549 B2 | 4/2017 | Benoit et al. |
| 9,892,267 B1 | 2/2018 | Paaske et al. |
| 10,079,677 B2 | 9/2018 | Benson et al. |
| 10,114,956 B1 | 10/2018 | Paaske et al. |
| 10,127,405 B2 | 11/2018 | Le Roy et al. |
| 10,216,457 B2 | 2/2019 | Takeshita et al. |
| 10,305,479 B1 | 5/2019 | Doll et al. |
| 10,417,429 B2 | 9/2019 | de Cesare et al. |
| 10,423,804 B2 | 9/2019 | Benson et al. |
| 10,484,172 B2 | 11/2019 | Sykora et al. |
| 10,521,596 B1 | 12/2019 | Paaske et al. |
| 10,523,431 B2 | 12/2019 | Benson et al. |
| 10,678,924 B2 | 6/2020 | Le Roy et al. |
| 10,719,607 B2 | 7/2020 | Walrant |
| 10,747,908 B2 | 8/2020 | Martel et al. |
| 10,853,504 B1 | 12/2020 | Paaske et al. |
| 10,872,152 B1 | 12/2020 | Martel et al. |
| 10,878,113 B2 | 12/2020 | Benson et al. |
| 10,929,515 B2 | 2/2021 | Prakash et al. |
| 11,244,066 B2 | 2/2022 | Kim et al. |
| 2007/0094444 A1* | 4/2007 | Sutardja .................. G06F 1/329 712/E9.023 |
| 2008/0144557 A1* | 6/2008 | Cohen ............... H04W 52/0261 370/311 |
| 2016/0055102 A1* | 2/2016 | de Cesare ............... H04L 9/002 713/193 |
| 2016/0299854 A1 | 10/2016 | Deivasigamani et al. |
| 2017/0329995 A1 | 11/2017 | Benoit et al. |
| 2020/0356669 A1 | 11/2020 | Kim et al. |
| 2020/0358618 A1 | 11/2020 | Lee et al. |
| 2020/0358620 A1 | 11/2020 | Kim et al. |
| 2021/0182435 A1* | 6/2021 | Hunacek ................ G06F 21/72 |

FOREIGN PATENT DOCUMENTS

| | | |
|---|---|---|
| KR | 10-2020-0130539 A | 11/2020 |
| KR | 10-2021-0016764 A | 2/2021 |

\* cited by examiner

ELECTRONIC DEVICE

CROSS-REFERENCE TO RELATED APPLICATION

This application is based on and claims priority under 35 U.S.C. § 119 to Korean Patent Application No. 10-2021-0111200, filed on Aug. 23, 2021, in the Korean Intellectual Property Office, the disclosure of which is incorporated by reference herein in its entirety.

BACKGROUND

1. Field

Embodiments relate to an electronic device.

2. Description of the Related Art

Data security for protecting data from inappropriate external attacks may utilize software and hardware together to protect data from advanced attacks. In data security, a key may be used to encrypt or decrypt data, and it may not be easy to decrypt data using a valid key, that is, a key different from the key used for encryption. Therefore, securely managing keys from external attacks may be important in data security.

SUMMARY

According to an embodiment, there is provided an electronic device operating in a normal mode or a low power mode, including a first non-volatile memory (NVM) configured to store data, a security device including a second NVM configured to store first security data generated in the low power mode, and a system on chip (SOC) including a security processor configured to access the first NVM to store the first security data in the first NVM in the normal mode.

According to another embodiment, there is provided an electronic device operating in a normal mode or a low power mode, including a first non-volatile memory (NVM) configured to store data, a security device including a second NVM configured to store first security data generated in the low power mode, a security processing module configured to communicate with the security device through a security channel and output a first write request signal and the first security data in the normal mode, wherein the first write request signal requests to store the first security data, and a system on chip (SOC) configured to communicate with each of the security processing module and the first NVM and provide the first security data, a first program command, and a first address to the first NVM in response to the first write request signal.

According to another embodiment, there is provided an electronic device operating in a normal mode or a low power mode, including a first non-volatile memory (NVM) configured to store data, a security device including a second NVM configured to store first security data generated in the low power mode, a system on chip (SOC) including a security processor configured to output a first write request signal requesting to store the first security data in the normal mode, a main processor configured to output a control command in response to the first write request signal, and a first memory controller configured to output a program command, an address, and the first security data to the first NVM in response to the control command, and a power controller configured to supply power to the first NVM, the security device, and the SOC in the normal mode and supply power to the security device and the security processor in the low power mode.

BRIEF DESCRIPTION OF THE DRAWINGS

Features will become apparent to those of skill in the art by describing in detail example embodiments with reference to the attached drawings in which.

DETAILED DESCRIPTION

Figure 1:
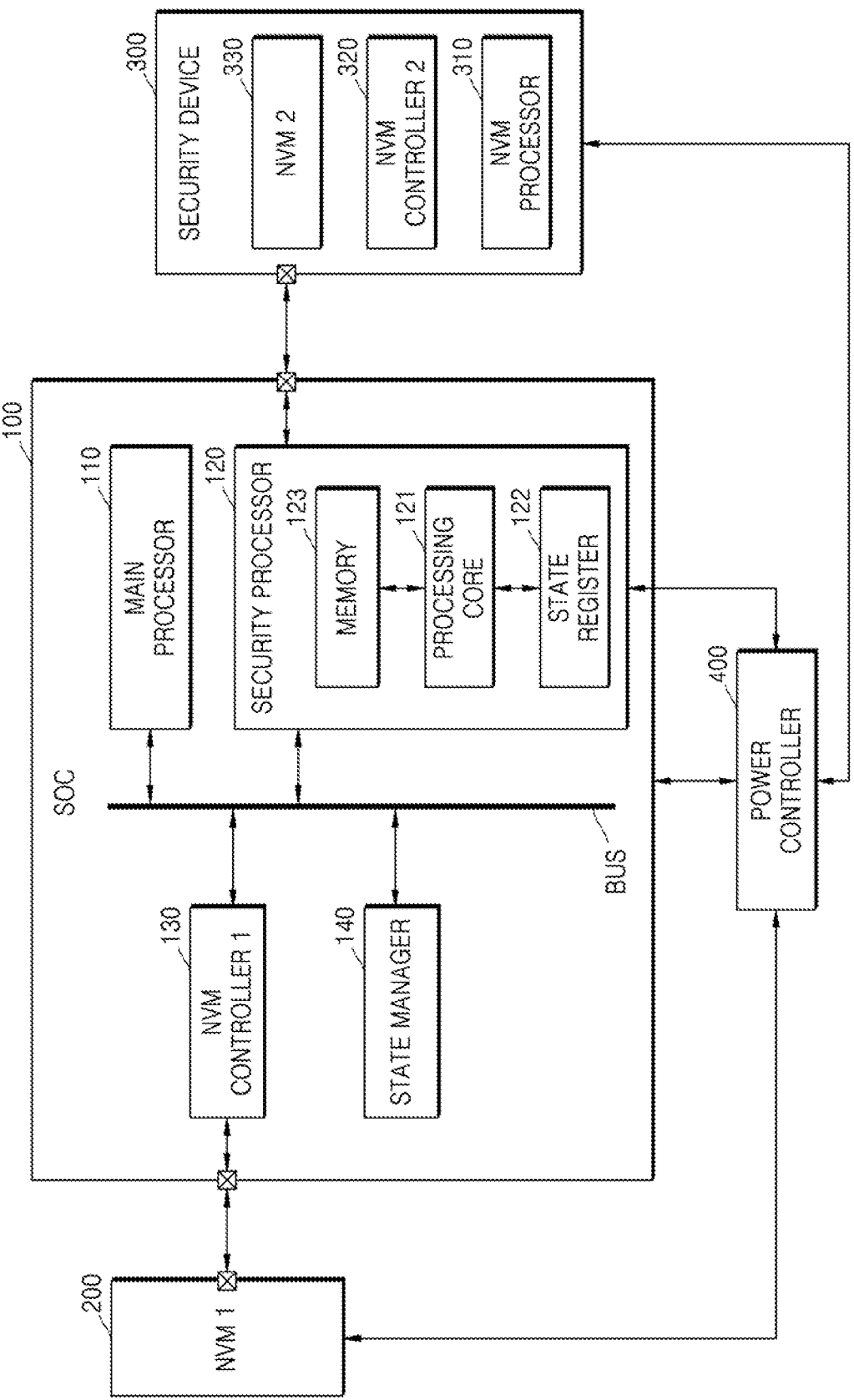
FIG. 1 is a diagram illustrating an electronic device according to an example embodiment.

FIG. 1 is a diagram illustrating an electronic device 10 according to an example embodiment.

Referring to FIG. 1, the electronic device 10 may be, e.g., a stationary computing system such as a server, a desktop computer, a kiosk, or the like, or a subsystem thereof. The electronic device 10 may be, e.g., a portable computing system such as a mobile phone, a wearable device, a laptop computer, or a subsystem thereof. The electronic device 10 may be, for another example, a subsystem included in a system different from a stand-alone computing system, such as a home appliance, an industrial device, and a transportation mean.

In an example embodiment, the electronic device 10 may operate in a normal mode or a low power mode, e.g., the electronic device 10 may be selectively operable in the normal mode and in the low power mode. In an example embodiment, some of the components included in the electronic device 10 may be deactivated in the low power mode. As used herein, the term "deactivation" may be referred to as "sleep", "idle", "standby", "turn off", or "low power", etc.

In an example embodiment, the electronic device 10 may include a system on chip (SOC) 100, a first non-volatile memory (NVM) (i.e., NVM 1) 200, a security device 300, and a power controller 400.

In an example embodiment, the SOC 100 may include a bus BUS, a main processor 110, a security processor 120, a first memory controller (i.e., NVM controller 1) 130, and a state manager 140. The state manager 140 may be implemented as an application performance management (APM).

In an example embodiment, the SOC 100 may be activated or deactivated according to a mode (e.g., a normal mode or a low power mode) of the electronic device 10.

For example, when the mode of the electronic device 10 is the normal mode, the SOC 100 is activated and power may be supplied to all of the main processor 110, the security processor 120, the first memory controller, and the state manager 140 included in the activated SOC 100. In this case, a power supply state of the activated SOC 100 corresponds to the normal mode and may be referred to as a first state.

As another example, when the mode of the electronic device 10 is the low power mode, the main processor 110 and the first memory controller 130 included in the SOC 100 may be deactivated and the security processor 120 included in the SOC 100 may be activated. In this case, a power supply state of the SOC 100 corresponds to the low power mode and may be referred to as a second state. The state manager 140 included in the SOC 100 may also be activated together with the security processor 120.

The main processor 110, the security processor 120, the first memory controller 130, and the state manager 140 may communicate with each other through the bus BUS.

The main processor 110 may process overall operations of the SOC 100. For example, the main processor 110 may perform booting in response to power-on of the electronic device 10. The main processor 110 may process data stored in the first NVM 200, and may load a program image stored in the first NVM 200 to the SOC 100. The main processor 110 may execute the program image stored in the first NVM 200. For example, the main processor 110 may provide a control command for instructing to read the program image stored in the first NVM 200 to the first memory controller 130, and may execute a series of instructions included in the read program image. In this specification, the main processor 110 performing an operation by executing the instructions included in the program image may be referred to as the main processor 110 performing the operation.

The main processor 110 may store data in the first NVM 200. The main processor 110 may provide a control command instructing to store data in the first NVM 200 to the first memory controller 130. Accordingly, data may be written to the first NVM 200 by the first memory controller 130.

At least one main processor 110 may be included in the SOC 100. A plurality of main processors may be processors performing the same function or performing different functions. For example, one of the main processors may be an application processor and the other may be a communication processor. In an example embodiment, the main processor 110 may include at least one core.

The security processor 120 may process data requiring security for various purposes. For example, the security processor 120 may safely process unique information related to a user of the electronic device 10, and may safely process unique information related to a manufacturer or a legitimate supplier of the electronic device 10. Data requiring security may be encrypted using a key, and encrypted data may be decrypted using the key to be used, and then encrypted again. Data may be encrypted or decrypted based on a certain cryptographic algorithm. In some example embodiments, data may be encrypted or decrypted by a symmetric key cryptographic algorithm, a public key cryptographic algorithm, or the like. The symmetric key cryptographic algorithm may include, e.g., data encryption standard (DES), advanced encryption standard (AES), and the like. The public key cryptographic algorithm may include, e.g., Rivest-Shamir-Adleman (RSA), an elliptic curve technique, and the like.

The data requiring security may include loading data indicating loading information of a program image, verification data indicating verification information of a digital signature, and encrypted data, user authentication data, main image version information, candidate image version information, and the like. Details thereof are described below with reference to FIGS. 2 and 3. In this specification, data requiring security may be referred to as security data.

The security processor 120 may access the first NVM 200. In an example embodiment, the security processor 120 may provide a write request signal requesting to write encrypted data to the main processor 110. In another implementation, the security processor 120 may provide a read request signal requesting to read the encrypted data to the main processor 110. The main processor 110 may provide a control command to the first memory controller 130, and the first memory controller 130 may access the first NVM 200 in response to the control command.

The security processor 120 may exclusively access the security device 300. In an example embodiment, the security processor 120 may provide a write request signal requesting that the encrypted data be written, to a memory processor (i.e., an NVM processor) 310. In another implementation, the security processor 120 may provide a read request signal requesting to read the encrypted data stored in a second NVM (i.e., an NVM 2) 330, to the memory processor 310. The memory processor 310 may provide a control command to a second memory controller (i.e., NVM controller 2) 320, and the second memory controller 320 may access the second NVM 330 in response to the control command.

The security processor 120 may be provided with power, separately from power supplied to the SOC 100, from the power controller 400. This is to activate the security processor 120 even when the mode of the electronic device 10 is the low power mode. Accordingly, the security processor 120 may independently perform an operation.

The security processor 120 may generate a key used for a program image executed by the main processor 110. For example, the security processor 120 may generate a key used for encryption or decryption of user identification information for identifying the user of the electronic device 10. Also, the security processor 120 may generate a key used for encryption or decryption of system identification information for software updating of the electronic device 10. The security processor 120 may provide the generated key to the main processor 110 through the bus BUS.

In this specification, an operation of generating a key for data security, an operation of encrypting data requiring security using the key, or an operation of decrypting encrypted data using the key may be referred to as a security operation. That is, the security processor 120 may generate security data by performing the security operation.

The security processor 120 may be formed in a region physically isolated from other components, e.g., the main processor 110, of the SOC 100 in order to strengthen the security of data requiring security and/or a key (or secret key) used in the cryptographic algorithm. The security processor 120 may include a component that cannot be accessed by other components of the SOC 100 and may perform an operation independently. For example, even a security program (or security software) executed by the main processor 110 may be restricted in access to components included in the security processor 120. Accordingly, the security processor 120 may significantly improve a security level of the electronic device 10.

In an example embodiment, power consumption of the security processor 120 may be lower than power consumption of the main processor 110.

In an example embodiment, the security processor 120 may include a processing core 121, a state register 122, and a memory (i.e., an internal memory) 123. In this specification, an operation performed by each of the components included in the security processor 120 may be referred to as being performed by the security processor 120.

The processing core 121 may be any processing element configured to execute instructions. The processing core 121 may perform a security operation by executing a series of instructions stored in the internal memory 123. For example, the processing core 121 may generate a key used in the cryptographic algorithm. In another implementation, the processing core 121 may encrypt data requiring security using the key to generate encrypted data. In another implementation, the processing core 121 may decrypt the encrypted data using the key to generate data (or decrypted data). As another example, the processing core 121 may verify a digital signature for candidate firmware or verify version information of the candidate firmware.

The processing core 121 may be included as at least one processing core in the security processor 120. In this specification, a program image including instructions executed by the at least one processing core 121 may be referred to as a security firmware or a security firmware image. The processing core 121 may be implemented as a central processing unit (CPU).

In an example embodiment, the processing core 121 may check a power supply state of the SOC 100 by monitoring a power flag stored in the state register 122. In addition, the processing core 121 may access the first NVM 200 or access the second NVM 330 according to the power supply state of the SOC 100. In an example embodiment, when the power supply state of the SOC 100 is the first state, the processing core 121 may access the first NVM 200 or the second NVM 330. As another example, when the power supply state of the SOC 100 is the second state, the processing core 121 may access only the second NVM 330.

In an example embodiment, the second NVM 330 may store security data in the low power mode (or in the second state). In this case, the processing core 121 may access the second NVM 330 to read the security data. In addition, the processing core 121 may load the security data stored in the second NVM 330 to the internal memory 123. After the security data is stored in the second NVM 330, when the mode of the electronic device 10 is switched to the normal mode (or when the power supply state of the SOC 100 is switched from the second state to the first state), the processing core 121 may access the first NVM 200 to store the security data stored in the second NVM 330 or the security data loaded to the internal memory 123.

The state register 122 may store information on the power supply state of the SOC 100. The state register 122 may be accessed by the state manager 140 or the processing core 121. In an example embodiment, e.g., the state manager 140 may access the state register 122 to store a power flag. In another implementation, the processing core 121 may access the state register 122 to check the power supply state indicated by the power flag. The state register 122 may be implemented as a mailbox or mailbox hardware. As described above, the state manager 140 may be implemented as an application performance management (APM).

The power supply state of the SOC 100 may be expressed by a logic level of the power flag. For example, the power flag may be indicated as ON or OFF. In another implementation, the power flag may be indicated as a logic high level or a logic low level. In another implementation, the power flag may be indicated as "1" or "0". ON, the logic high level, and "1" may indicate that the power supply state of the SOC 100 is the first state, that is, a state in which power is supplied to all components included in the SOC 100. OFF, the logic low level, and "0" may indicate that the power supply state of the SOC 100 is the second state, that is, a state in which the security processor 120 is powered. However, this may be implemented differently so that the opposite may be the case.

The internal memory 123 may store data used for the operation of the security processor 120. For example, the internal memory 123 may include a random access memory (RAM) which temporarily stores the security firmware image or data processed by the processing core 121. As another example, the internal memory 123 may include a read only memory (ROM) storing instructions that may be executed by the at least one processing core 121. As another example, the internal memory 123 may store at least a portion of the read program image.

In an example embodiment, the security processor 120 may further include a DMA controller performing direct memory access, a hardware accelerator designed to perform a predefined operation at a high speed, and the like. Here, the hardware accelerator may include a crypto engine. The crypto engine may implement a hash function generating a hash of at least a portion of the read program image, perform encryption and/or decryption of data, or verify a digital signature of the program image.

In an example embodiment, the security processor 120 may further include a random number generator for generating a key pair and the like, a component providing a hardware key, and the like.

The first memory controller 130 may control an overall operation of the first NVM 200. The first memory controller 130 may control the first NVM 200 to perform a program operation (or a write operation), a read operation, or an erase operation in response to a write request, a read request, or an erase request from the main processor 110. During the program operation, the first memory controller 130 may provide a program command, a physical address, and data to the first NVM 200. During the read operation, the first memory controller 130 may provide a read command and a physical address to the first NVM 200. During the erase operation, the first memory controller 130 may provide an erase command and a physical address to the first NVM 200. When the first NVM 200 is implemented as a flash memory, the first memory controller 130 may be implemented as a flash controller providing a flash memory interface. The first memory controller 130 and the first NVM 200 may communicate with each other through a communication channel. For example, the first NVM 200 may support a serial interface, and the first memory controller 130 may provide a universal serial interface (USI) such as an inter-integrated circuit (I2C), a serial peripheral interface (SPI), or the like.

The state manager 140 may output a power flag indicating a power supply state of the SOC 100. The state manager 140 may continue to receive power from the power controller 400.

In an example embodiment, when the mode of the electronic device 10 is switched from the normal mode to the low power mode, the state manager 140 may store a power flag indicating that the power supply state of the SOC 100 is the second state, e.g., a power flag having a logic low level, in the state register 122. As another example, when the mode of the electronic device 10 is switched from the low power mode to the normal mode, the state manager 140 may store a power flag indicating that the power supply state of the SOC 100 is the first state, e.g., a power flag having a logic high level in the state register 122.

The first NVM 200 may receive a command and an address from the first memory controller 130, and may access a memory cell selected by an address among memory cells. The first NVM 200 may perform an operation indicated by a command on the memory cell selected by the address. Here, the command may include, e.g., a program command, a read command, or an erase command, and the operation indicated by the command may include, e.g., a program operation, a read operation, or an erase operation. The first NVM 200 may include, e.g., a flash memory. The flash memory or non-volatile memory may include, e.g., NAND flash memory, vertical NAND flash memory, NOR flash memory, resistive random access memory, phase-change memory, magnetoresistive random access memory, and the like.

In an example embodiment, the first NVM 200 may be activated or deactivated according to the mode (e.g., the normal mode or the low power mode) of the electronic device 10. For example, when the mode of the electronic device 10 is the normal mode, the first NVM 200 may be activated. As another example, when the mode of the electronic device 10 is the low power mode, the first NVM 200 may be deactivated.

The security device 300 may be exclusively accessed by the security processor 120. The security device 300 and the security processor 120 may communicate with each other through a security channel. The security channel may include a communication channel providing security. The security device 300 may store a program image executed by the security processor 120. The security device 300 may store information used for the security processor 120 to generate a key. The security device 300 may provide the security processor 120 with the program image executed by the security processor 120 or the information used for the security processor 120 to generate a key. Because the security processor 120 operates independently regardless of the mode of the electronic device 10, the security device 300 may also operate together with the security processor 120.

In an example embodiment, the security device 300 may include the memory processor 310, the second memory controller 320, and the second NVM 330.

The memory processor 310 may communicate with the processing core 121 through the security channel. The memory processor 310 may generate a control command in response to a request signal from the processing core 121. The memory processor 310 may provide the generated control command to the second memory controller 320. The memory processor 310 may provide data received from the second memory controller 320 to the processing core 121. The memory processor 310 may be implemented as a CPU.

Similar to the first memory controller 130, the second memory controller 320 may control the second NVM 330 to perform a program operation, a read operation, or an erase operation in response to a write request, a read request, or an erase request from the memory processor 310. The second memory controller 320 may write user authorization information input from the user in the second NVM 330 after a user approval is activated. Here, the user authorization information may include a user identification (ID), a password, and the user's biometric information (e.g., fingerprint information, iris information, face recognition information, voice information, and vein information).

The second NVM 330 may store data requiring security, that is, security data. Similar to the first NVM 200, the second NVM 330 may receive a command and an address from the second memory controller 320 and access a memory cell selected by the address among the memory cells. The second NVM 330 may be, e.g., a flash memory.

In an example embodiment, a storage capacity of the second NVM 330 may be smaller than a storage capacity of the first NVM 200.

In an example embodiment, power consumption of the second NVM 330 may be lower than power consumption of the first NVM 200.

The power controller 400 may generally control power supplied to the electronic device 10 from the outside. The power controller 400 may control power supplied to each of the SOC 100, the first NVM 200, and the security device 300. The power controller 400 may provide power supplied to the security processor 120 included in the SOC 100 separately from the SOC 100. In an example embodiment, the power controller 400 may control power supplied to the SOC 100 and the first NVM 200 according to the mode of the electronic device 10. The power controller 400 may be referred to as a power management integrated circuit (PMIC).

In this specification, in the SOC 100, the bus BUS, the main processor 110, the first memory controller 130, and the state manager 140 may be referred to as first circuits, and the security processor 120 may be referred to as a second circuit.

Figure 2:
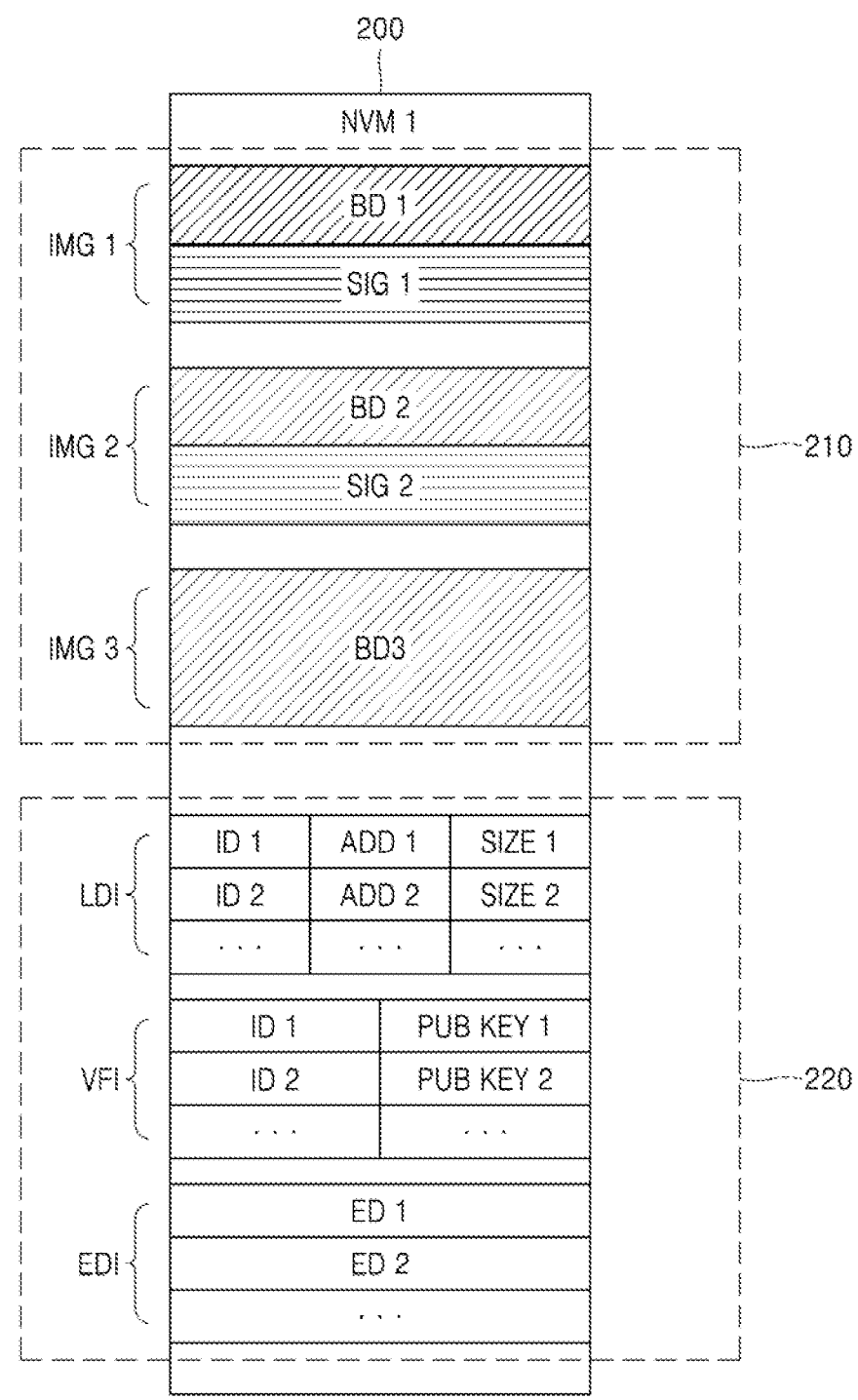
FIG. 2 is a diagram illustrating a first non-volatile memory (NVM) according to an example embodiment.
Figure 3:
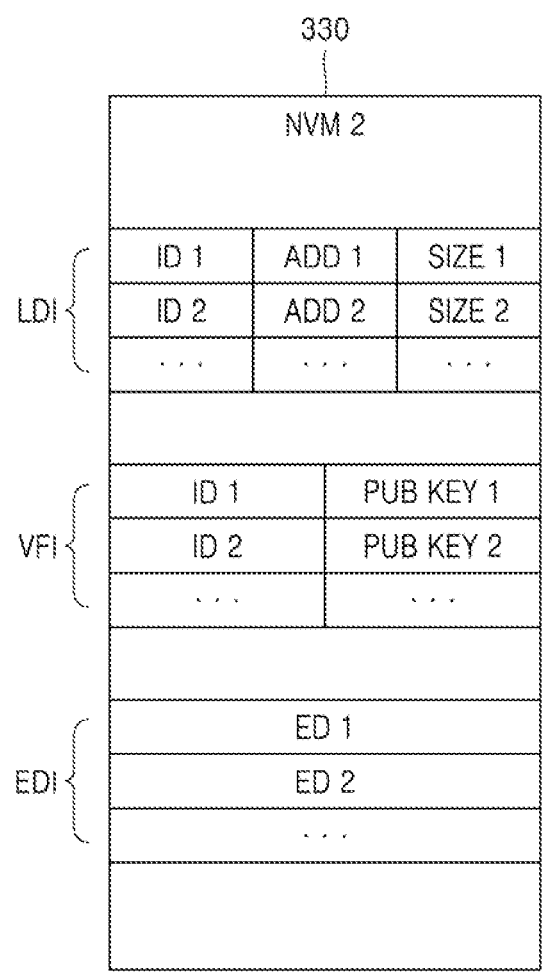
FIG. 3 is a diagram illustrating a second NVM according to an example embodiment.

FIG. 2 is a diagram illustrating the first NVM 200 according to an example embodiment, and FIG. 3 is a diagram illustrating the second NVM 330 according to an example embodiment.

Referring to FIGS. 1 and 2, the first NVM 200 may include a first region 210 and a second region 220. The first region 210 may be referred to as a non-security region. The second region 220 may be referred to as a security region.

At least one program image may be stored in the first region 210. Referring to FIG. 2, e.g., first to third program images IMG 1, IMG 2, and IMG 3 may be stored in the first region 210.

The program images may include binary data. Referring to FIG. 2, the first program image IMG 1 may include first binary data BD 1, the second program image IMG 2 may include second binary data BD 2, and the third program image IMG 3 may include only third binary data BD 3. The binary data may include instructions executed by the main processor 110, and may be generated, e.g., by compiling a source code written in a programming language. In some example embodiments, the binary data may include instructions as well as data referenced by the instructions. The binary data may be referred to as a binary image, a binary code, or a binary code image.

The program image may include a digital signature (or an electronic signature). Referring to FIG. 2, the first program image IMG 1 may include a first digital signature SIG 1, and the second program image IMG 2 may include a second digital signature SIG 2. The digital signatures (including the first digital signature SIG 1 and the second digital signature SIG 2) may be used to determine authenticity of the program images (the first program image IMG 1 and the second program image IMG 2), i.e., that the program images were generated by an authenticated person. Referring to FIG. 2, the first digital signature SIG 1 may be used to determine the authenticity of the first program image IMG 1. As digests generated from a common source, a digital signature and verification information may be generated, and the digital signature may be verified by verification information. For example, a key pair including a private key and a public key may be generated, a digital signature may be generated from the private key, and the digital signature may be verified by the public key as verification information, based on a mathematical algorithm.

The security processor 120 may determine the authenticity of the program image by verifying the digital signature. To this end, the security processor 120 may obtain the verification information and verify the digital signature based on the verification information. In some example embodiments, in the manufacturing process of the SOC 100 and/or the electronic device 10, the public key and/or a digest of the public key as the verification information may be provisioned to the security processor 120, and the security processor 120 may verify the digital signature based on the provisioned public key and/or the digest of the public key. A program image including the digital signature that has passed verification, that is, an authenticated program image, may be trusted. The main processor 110 may execute the authenticated program image.

The security processor 120 may read the digital signature from the first region 210 of the first NVM 200, and generate a key based on the read digital signature. For example, the security processor 120 may generate a key based on the digital signature included in a program image requesting the key, or generate a key based on a digital signature included in a program image different from the program image requesting the key.

Loading information LDI, verification information VFI, and encryption information EDI may be stored in the second region 220. In an example embodiment, the loading information LDI, the verification information VFI, and the encryption information EDI may be stored in the first NVM 200 when the mode of the storage device 10 is the normal mode.

The loading information LDI may include an identifier of the program image and an address and size corresponding thereto. Referring to FIG. 2, e.g., the loading information LDI may include a first identifier ID 1 of the first program image IMG 1, and a first address ADD 1 and a first size SIZE 1 corresponding thereto, and the first program image IMG 1 may be stored in a region starting at the first address ADD 1 of the first NVM 200 and corresponding to the first size SIZE 1. In some example embodiments, the first size SIZE 1 may be an address offset from the first address ADD 1 to an end address of the first program image IMG 1. In some example embodiments, the loading information LDI may include an end address of the first program image, instead of the first size SIZE 1. Similarly, the loading information LDI may include a second identifier ID 2 of the second program image, and a second address ADD 2 and a second size SIZE 2 corresponding thereto. The security processor 120 may obtain an address and a size corresponding to an identifier of a program image from the second region 220 of the first NVM 200.

The verification information VFI may include an identifier of a program image and a public key corresponding thereto. Referring to FIG. 2, e.g., the verification information VFI may include a first identifier ID 1 of the first program image IMG 1 and a first public key PUB KEY 1 corresponding thereto, and the first digital signature SIG 1 included in the first program image IMG 1 may be verified by the first public key PUB KEY 1. Similarly, the verification information VFI may include a second identifier ID 2 of the second program image and a second public key PUB KEY 2 corresponding thereto, and a digital signature included in the second program image may be verified by the second public key PUB KEY 2. The security processor 120 may obtain an identifier of the program image and a public key corresponding thereto from the second region 220 of the first NVM 200.

The encryption information EDI may include encrypted data. Referring to FIG. 2, the encryption information EDI may include first encrypted data ED 1 and second encrypted data ED 2.

In an example embodiment, the security processor 120 may obtain the loading information LDI, the verification information VFI, and/or the encryption information EDI from the main processor 110. In another implementation, the security processor 120 may provide the loading information LDI, the verification information VFI, and/or the encryption information EDI to the main processor 110 to write the loading information LDI, the verification information VFI, and/or the encryption information EDI in the first NVM 200.

Referring to FIG. 3, the loading information LDI, the verification information VFI, and the encryption information EDI may be stored in the second NVM 330. In an example embodiment, the loading information LDI, the verification information VFI, and the encryption information EDI may be stored in the second NVM 330 when the mode of the storage device 10 is the normal mode. In another example embodiment, the loading information LDI, the verification information VFI, and the encryption information EDI may be stored in the second NVM 330 when the mode of the storage device 10 is the low power mode.

Figure 4:
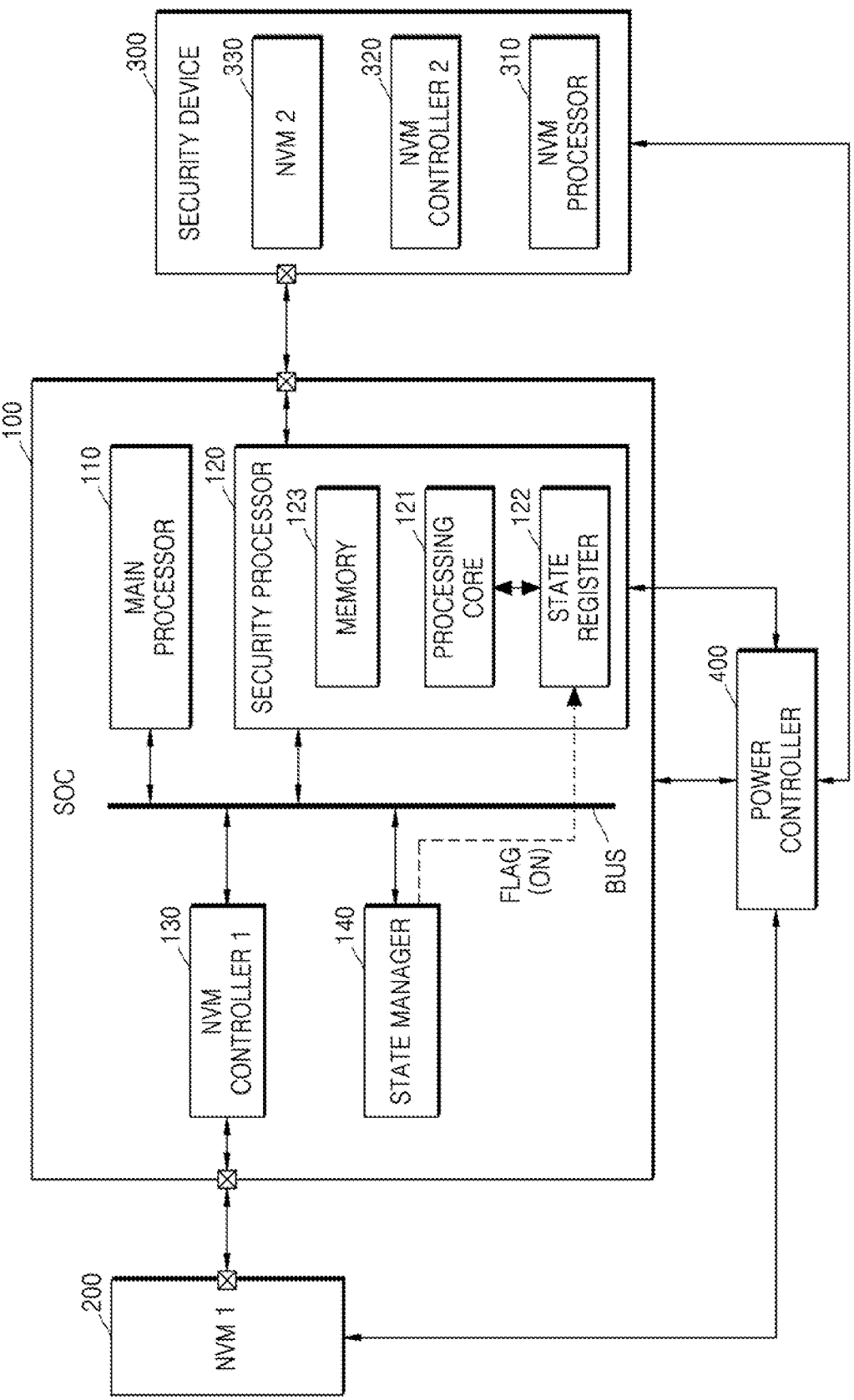
FIG. 4 is a diagram illustrating a normal mode of an electronic device according to an example embodiment.

FIG. 4 is a diagram illustrating the normal mode of the electronic device 10 according to an example embodiment.

Referring to FIG. 4, the electronic device 10 may operate in the normal mode. In this case, the power controller 400 may supply power to the SOC 100, the security processor 120, the first NVM 200, and the security device 300.

The state manager 140 may store a power flag FLAG indicating ON in the state register 122, through the bus BUS.

The power flag FLAG stored in the state register 122 may indicate that the power supply state of the SOC 100 is the first state.

The processing core 121 may monitor the state register 122 to perform a security operation. As a result of the monitoring, the processing core 121 may determine that the power supply state of the SOC 100 is the first state.

Figure 5A:
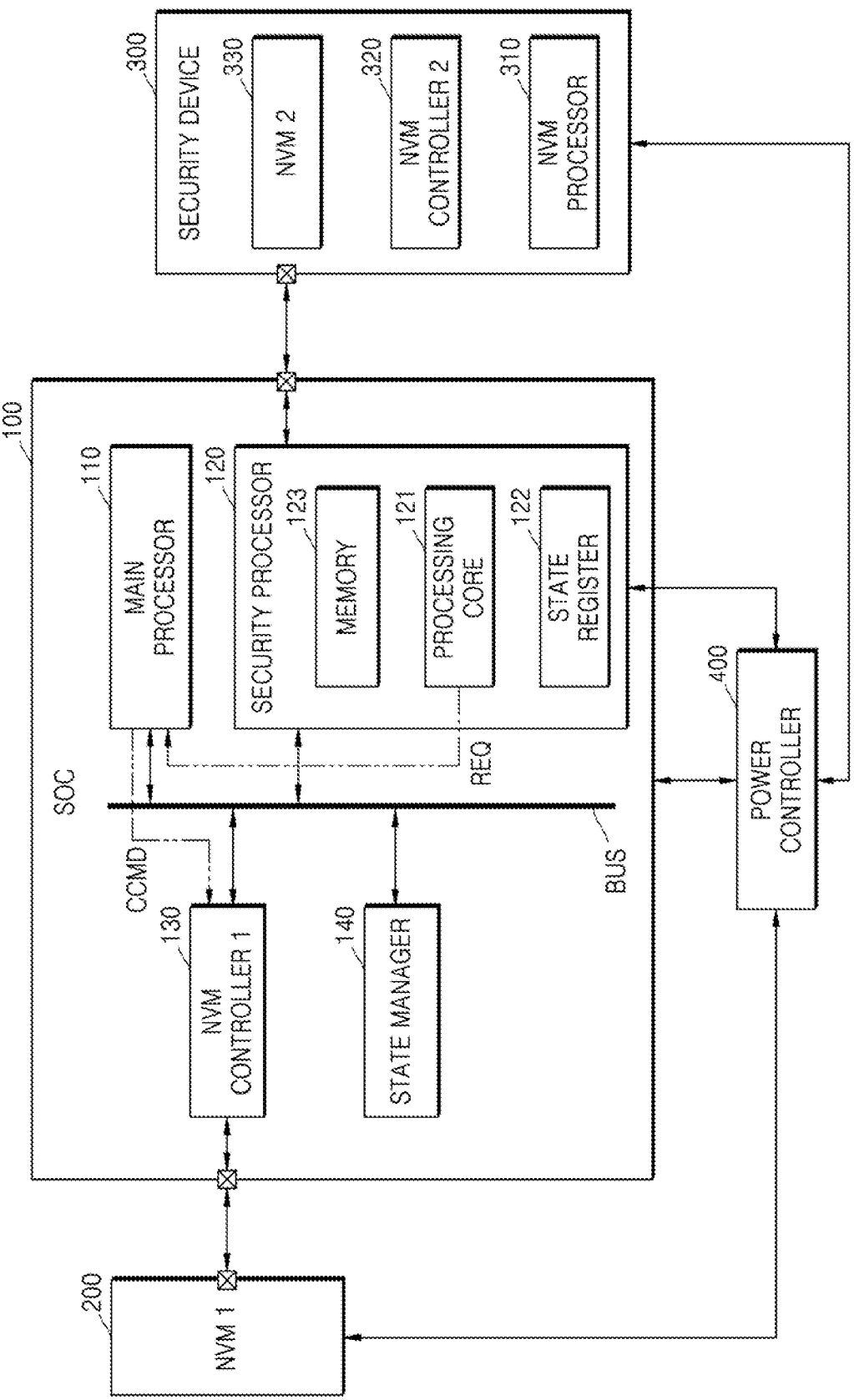
FIGS. 5A and 5B are diagrams illustrating example embodiments of controlling an NVM in a normal mode.
Figure 5B:
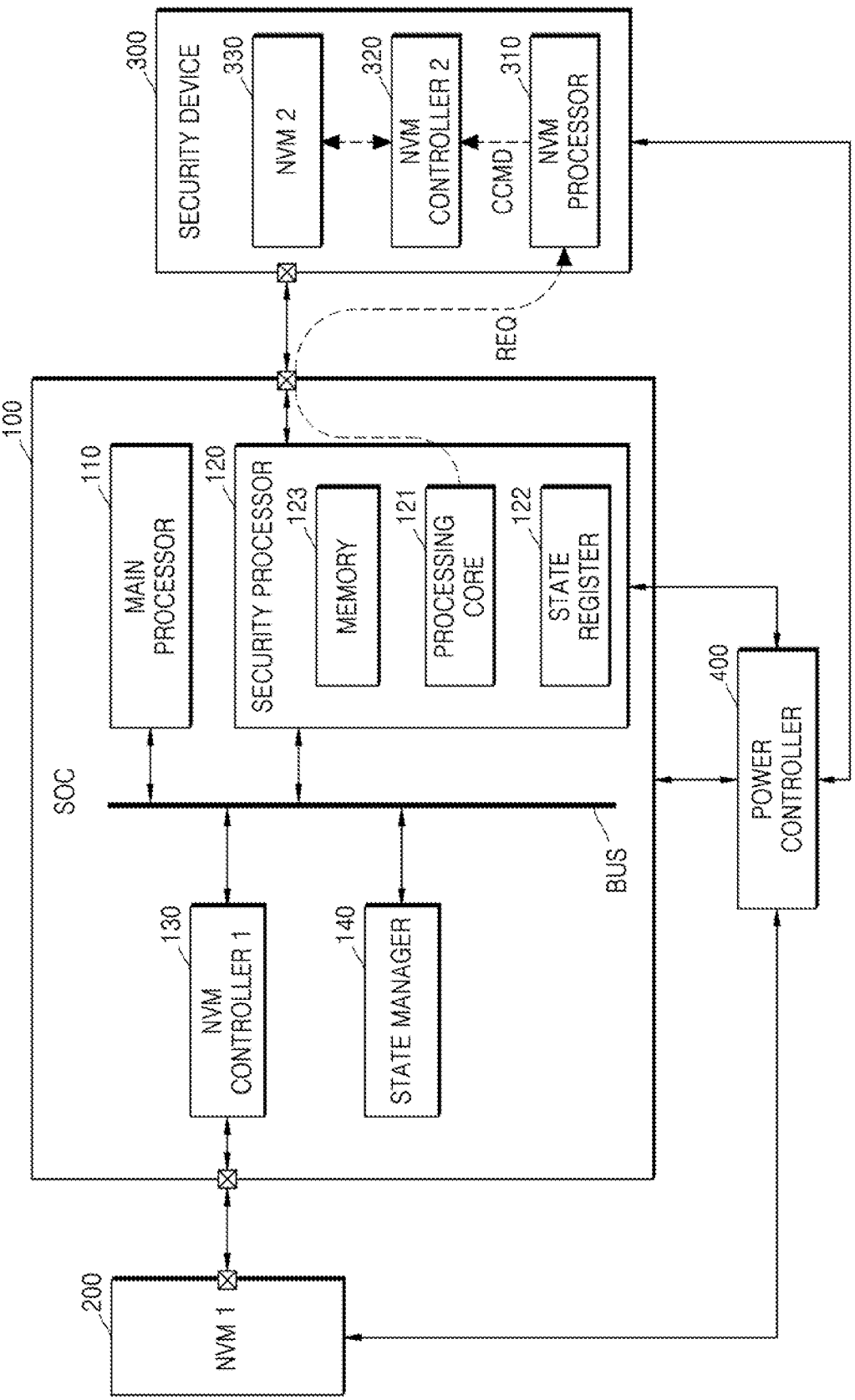

FIGS. 5A and 5B are diagrams illustrating example embodiments of controlling the NVMs 200 and 330 in the normal mode. FIG. 5A is a diagram illustrating an example embodiment in which the security processor 120 accesses the first NVM 200 in the normal mode. FIG. 5B is a diagram illustrating an example embodiment in which the security processor 120 accesses the second NVM 330 in the normal mode.

Referring to FIG. 5A, in the normal mode, the security processor 120 may provide a request signal REQ to the main processor 110 through the bus BUS. Here, the request signal REQ may be, e.g., the write request signal or the read request signal described above. When the request signal REQ is the write request signal, the security processor 120 may provide security data, e.g., encrypted data, verification data, etc., together with the request signal REQ to the main processor 110.

In response to the request signal REQ, the main processor 110 may provide a control command CCMD, for instructing to perform an operation according to the request signal REQ, to the first memory controller 130 through the bus BUS. The operation according to the request signal REQ may include, e.g., a program operation or a read operation.

The first memory controller 130 may provide a command and an address to the first NVM 200 in response to the control command CCMD. When the operation according to the request signal REQ is a program operation, the first memory controller 130 may additionally provide security data to the first NVM 200.

The first NVM 200 may store security data or provide the stored security data to the first memory controller 130. When the first NVM 200 provides the stored security data to the first memory controller 130, the first memory controller 130 may provide the security data to the security processor 120 through the bus BUS.

Referring to FIG. 5B, in the normal mode, the security processor 120 may provide the request signal REQ to the memory processor 310 through the security channel. Here, the request signal REQ may include, e.g., the write request signal or the read request signal described above.

The memory processor 310 may provide a control command CCMD instructing to perform an operation according to the request signal REQ to the second memory controller 320. The operation according to the request signal REQ may include, e.g., a program operation or a read operation.

The second memory controller 320 may provide a command and an address to the second NVM 330 in response to the control command CCMD. When the operation according to the request signal REQ is a program operation, the second memory controller 320 may additionally provide security data to the second NVM 330.

The second NVM 330 may store security data or provide the stored security data to the second memory controller 320. When the second NVM 330 provides the stored security data to the second memory controller 320, the second memory controller 320 may provide the security data to the security processor 120 through the security channel.

An operation of the security processor 120 accessing the first NVM 200 as shown in FIG. 5A and an operation of the security processor 120 accessing the second NVM 330 as shown in FIG. 5B may be selectively executed. In the case of the operation of the security processor 120 accessing the first NVM 200 as shown in FIG. 5A, the main processor 110 and the first memory controller 130 are used. Because the main processor 110 may perform other processes such as executing instructions included in the program image, latency may occur according to the operation of the main processor 110. Meanwhile, in the case of the operation of the security processor 120 accessing the second NVM 330 as shown in FIG. 5B, because the security processor 120 communicates with the security device 300, latency according to the operation of the main processor 110 may not occur.

Figure 6:
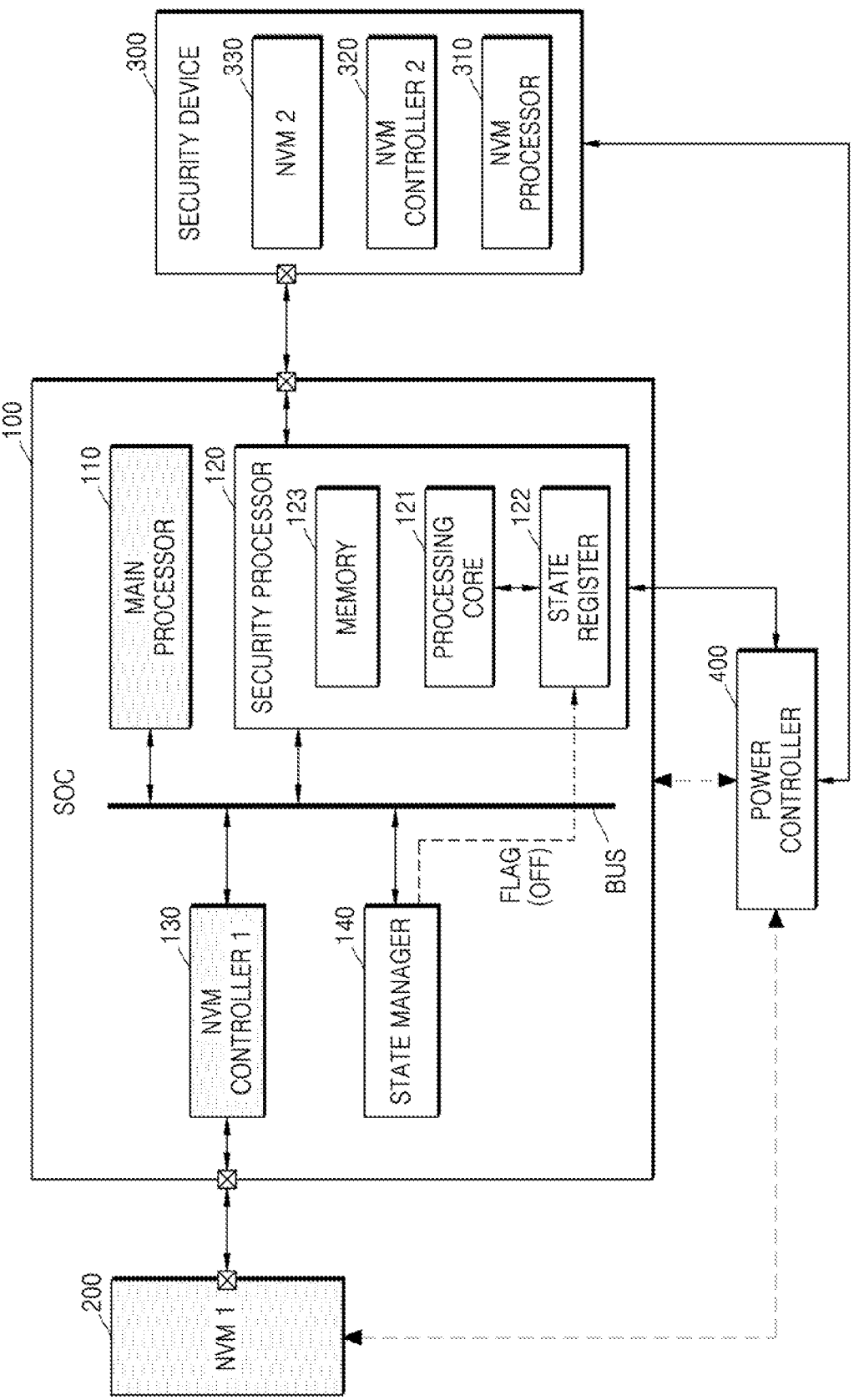
FIG. 6 is a diagram illustrating a low power mode of an electronic device according to an example embodiment.

FIG. 6 is a diagram illustrating the low power mode of the electronic device 10 according to an example embodiment.

Referring to FIG. 6, the electronic device 10 may operate in the low power mode. In this case, the power controller 400 may supply power to the security processor 120 and the security device 300. The power controller 400 may also supply power to the state manager 140.

The main processor 110 and the first memory controller 130 included in the SOC 100 may be deactivated. Also, the first NVM 200 may be deactivated.

The state manager 140 may store a power flag FLAG indicating OFF in the state register 122, through the bus BUS.

The power flag FLAG stored in the state register 122 may indicate that the power supply state of the SOC 100 is the second state.

The processing core 121 may monitor the state register 122 to perform a security operation. As a result of the monitoring, the processing core 121 may determine that the power supply state of the SOC 100 is the second state.

Figure 7:
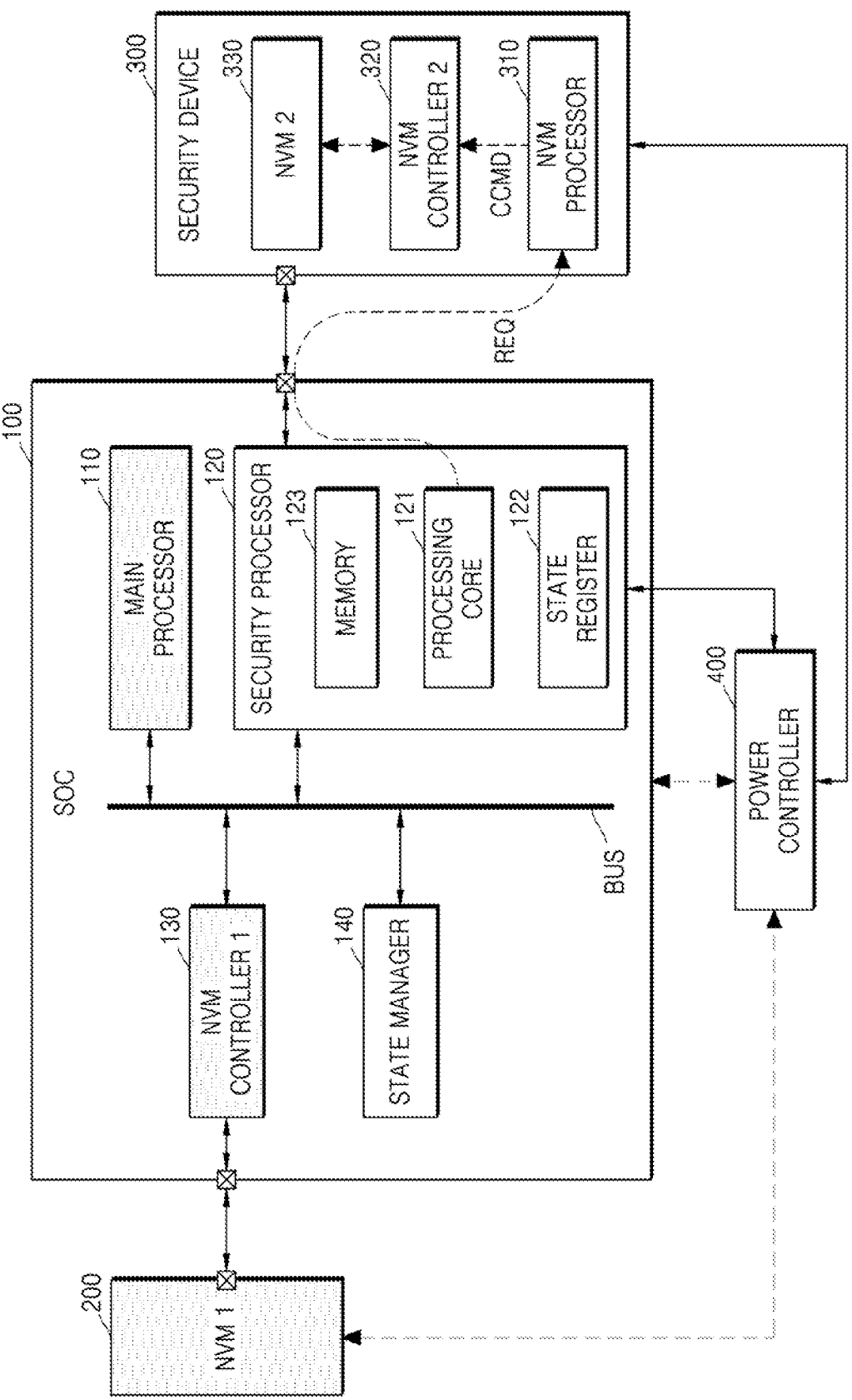
FIG. 7 is a diagram illustrating an example embodiment of controlling a second NVM in a low power mode.

FIG. 7 is a diagram illustrating an example embodiment of controlling the second NVM 330 in the low power mode.

Referring to FIG. 7, in the low power mode, the main processor 110 and the first memory controller 130 included in the SOC 100 may be deactivated. Also, the first NVM 200 may be deactivated.

Similar to the example embodiment described with reference to FIG. 5B, in the low power mode, the security processor 120 may provide the request signal REQ to the memory processor 310 through the security channel. The memory processor 310 may provide a control command CCMD instructing to perform an operation according to the request signal REQ to the second memory controller 320. The second memory controller 320 may provide a command and an address to the second NVM 330 in response to the control command CCMD. The second NVM 330 may store security data or provide the stored security data to the second memory controller 320. When the second NVM 330 provides the stored security data to the second memory controller 320, the second memory controller 320 may provide the security data to the security processor 120 through the security channel.

The security processor 120 may load the security data provided from the second memory controller 320 to the internal memory 123.

As described above, in the normal mode, the data requiring security may be processed and stored even without activating the main processor in the case of operating in the low power mode, thereby reducing power consumption of the electronic device 10 or the SOC 100.

As described above, in the normal mode, the data requiring security in the case of operating in the low power mode may be processed, thereby strengthening a security level of the electronic device 10.

Figure 8:
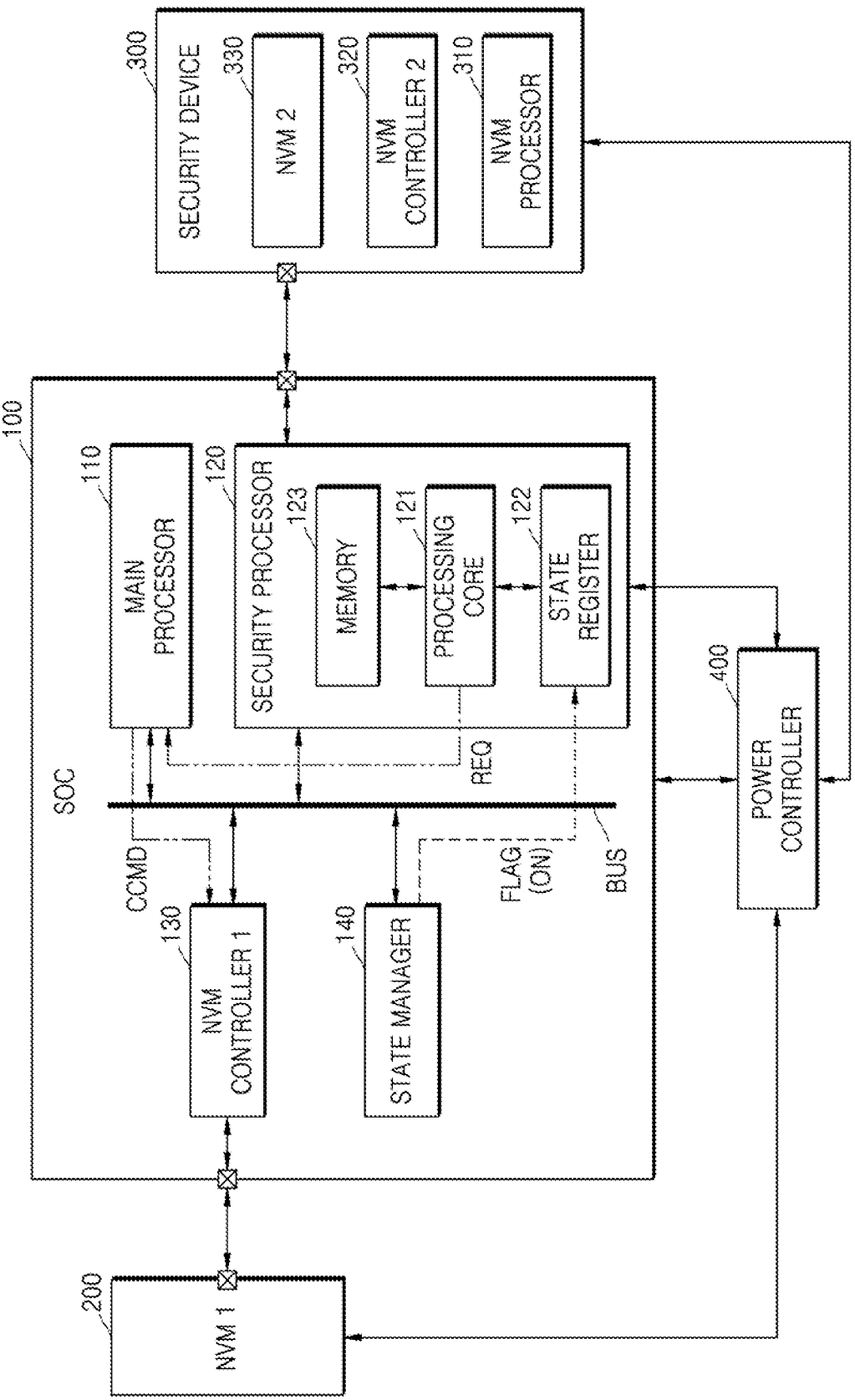
FIG. 8 is a diagram illustrating an example embodiment of controlling an NVM when a mode of an electronic device is switched from a low power mode to a normal mode.

FIG. 8 is a diagram illustrating an example embodiment of controlling the first NVM 200 or the second NVM 330 when a mode of an electronic device is switched from the low power mode to the normal mode.

Referring to FIG. 8, the mode of the electronic device 10 may be switched from the low power mode to the normal mode. In this case, the power controller 400 may re-supply power to the deactivated SOC 100 and the deactivated first NVM 200. The power supply state of the SOC 100 may be the first state. The state manager 140 may store the power flag FLAG indicating ON in the state register 122 through the bus BUS. The processing core 121 may monitor the state register 122 and determine that the power supply state of the SOC 100 is the first state.

In an example embodiment, in the normal mode, the security processor 120 may provide the main processor 110 with the request signal REQ for requesting to store the security data loaded in the internal memory 123 and the security data. The main processor 110 may provide a control command CCMD for instructing a program operation to the first memory controller 130 through the bus BUS in response to the request signal REQ. The operation according to the request signal REQ may include, e.g., a program operation or a read operation. The first memory controller 130 may provide a program command, an address, and security data to the first NVM 200 in response to the control command CCMD. The first NVM 200 may store security data in a memory block having an address in response to the program command.

In another example embodiment, in the normal mode, the security processor 120 may copy the security data stored in the second NVM 330 to the first NVM 200. In an example embodiment, the security processor 120 may provide the request signal REQ to the memory processor 310 through the security channel. Here, the request signal REQ may be a signal requesting to read the security data stored in the second NVM 330. The memory processor 310 may provide the control command CCMD instructing to perform a read operation according to the request signal REQ to the second memory controller 320. The second memory controller 320 may provide a read command and an address to the second NVM 330 in response to the control command CCMD. The second NVM 330 may provide the stored security data to the second memory controller 320. When the second NVM 330 provides the stored security data to the second memory controller 320, the second memory controller 320 may provide the security data to the security processor 120 through the security channel. The security processor 120 may provide the request signal REQ and security data to the main processor 110. The main processor 110 may provide the control command CCMD to the first memory controller 130. The first memory controller 130 may provide a program command, an address, and security data to the first NVM 200 in response to the control command CCMD. When a storage capacity of the first NVM 200 is greater than a storage capacity of the second NVM 330, the first NVM 200 or the second NVM 330 may be effectively used.

After the mode of the electronic device 10 is switched from the low power mode to the normal mode, as shown in FIG. 5A or 5B, the security processor 120 may perform a security operation to generate new security data and access the first NVM 200 or the second NVM 330 to store the generated new security data. In another implementation, after the mode of the electronic device 10 is switched from the low power mode to the normal mode, as shown in FIG. 5A or FIG. 5B, the security processor 120 may access the first NVM 200 or the second NVM to read other security data stored in the first NVM 200 or the second NVM 330.

As described above, when the mode of the storage device 10 is switched from the low power mode to the normal mode, the security level of the electronic device 10 may be strengthened by storing the security data in a storage device having a relatively large storage capacity.

Figure 9:
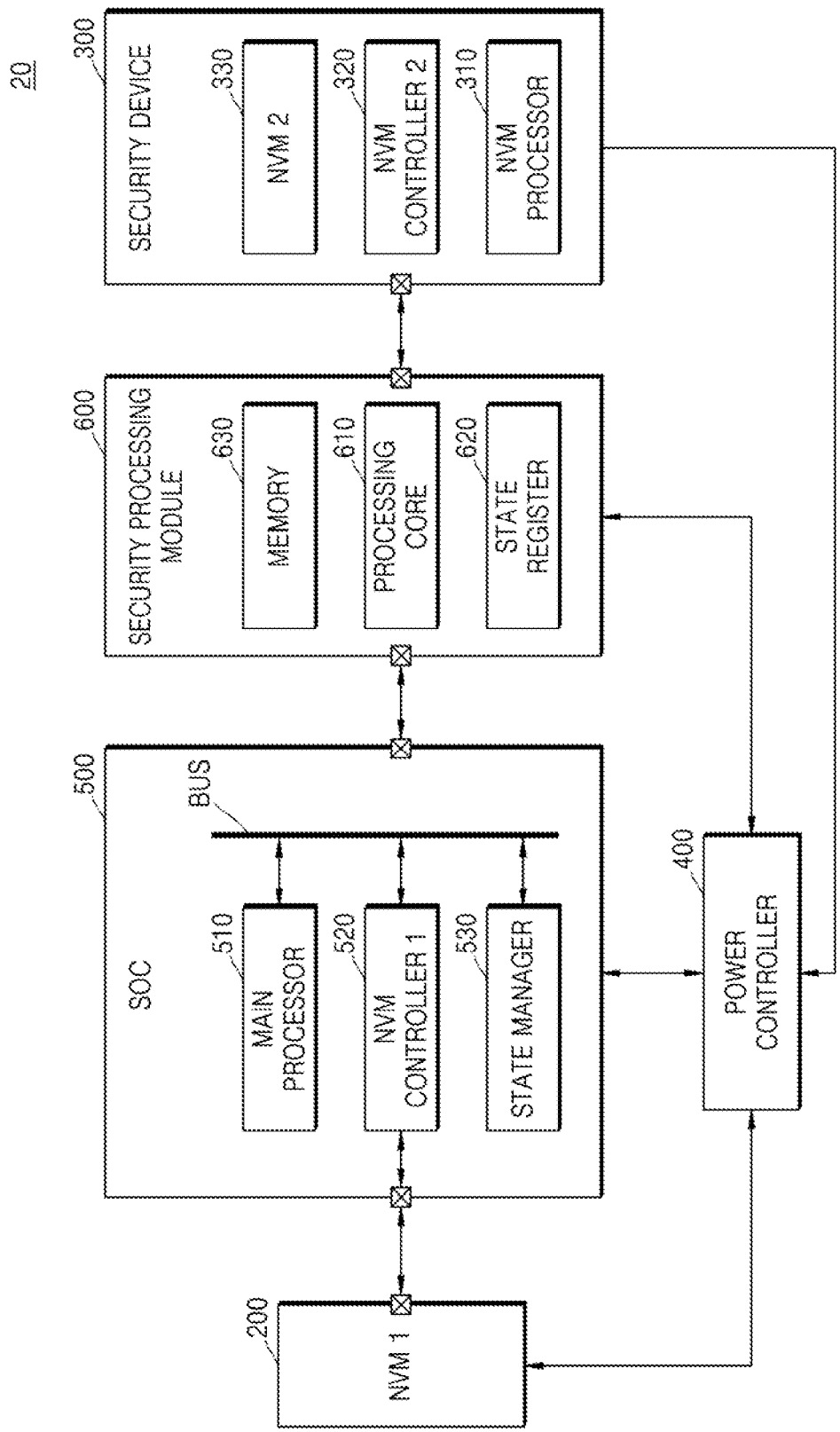
FIG. 9 is a diagram illustrating an electronic device according to another example embodiment.

FIG. 9 is a diagram illustrating an electronic device 20 according to another example embodiment.

Referring to FIG. 9, the electronic device 20 may include an SOC 500, a first NVM 200, a security device 300, and a power controller 400, similarly to the electronic device 10 described above with reference to FIG. 1. The electronic device 20 may further include a security processing module 600.

The SOC 500 may include a main processor 510, a first memory controller (i.e., NVM controller 1) 520, and a state manager 530. The main processor 510, the first memory controller 520, and the state manager 530 may be the same as the main processor 110, the first memory controller 130, and the state manager 140 described above with reference to FIG. 1.

The security processing module 600 may correspond to the security processor 120 described above with reference to FIG. 1 implemented as a module, and may be configured to exist separately from the SOC 500. The SOC 500 and the security processing module 600 may communicate with each other through a communication channel. Also, the security device 300 and the security processing module 600 may communicate with each other through a security channel. The security processing module 600 may include a processing core 610, a state register 620, and a memory (i.e., an internal memory) 630, a description of which is as described above with reference to FIGS. 1 to 8.

In an example embodiment, the security processing module 600 may output a first write request signal for requesting to store first security data and the first security data to the SOC 500 in the normal mode. In addition, the SOC 500 may provide the first security data, a first program command, and a first address to the first NVM 200 in response to the first write request signal. In an example embodiment, the internal memory 630 may temporarily store the first security data. The state manager 530 may output a power flag corresponding to the normal mode to the state register 620. The processing core 610 may output the first write request signal and the temporarily stored first security data to the main processor 510 based on a result of monitoring the power flag stored in the state register 620. The main processor 510 may output a control command instructing to store the first security data to the first memory controller 520 in response to the first write request signal. The first memory controller 520 may provide the first program command, the first address, and the first security data to the first NVM 200 in response to the control command.

In another example embodiment, the security processing module 600 may generate second security data by performing a security operation in the normal mode, and provide the second security data and a second write request signal to the SOC 500 according to characteristics of the second security data. The SOC 500 may provide the second security data, the second program command, and the second address to the first NVM 200 in response to the second write request signal. Here, the characteristics of the second security data may include, e.g., a size of the second security data and importance (or a security level) of the second security data.

In another example embodiment, the security processing module 600 may perform a security operation in the normal mode to generate second security data, and access the second NVM 330 to store the second security data in the second NVM 330.

In another example embodiment, the security processing module 600 may access the second NVM in the low power mode.

The power controller 400 may supply power to the first NVM 200, the security device 300, the SOC 500, and the security processing module 600 in the normal mode. The power controller 400 may supply power to the security device 300 and the security processing module 600 in the low power mode.

Figure 10:
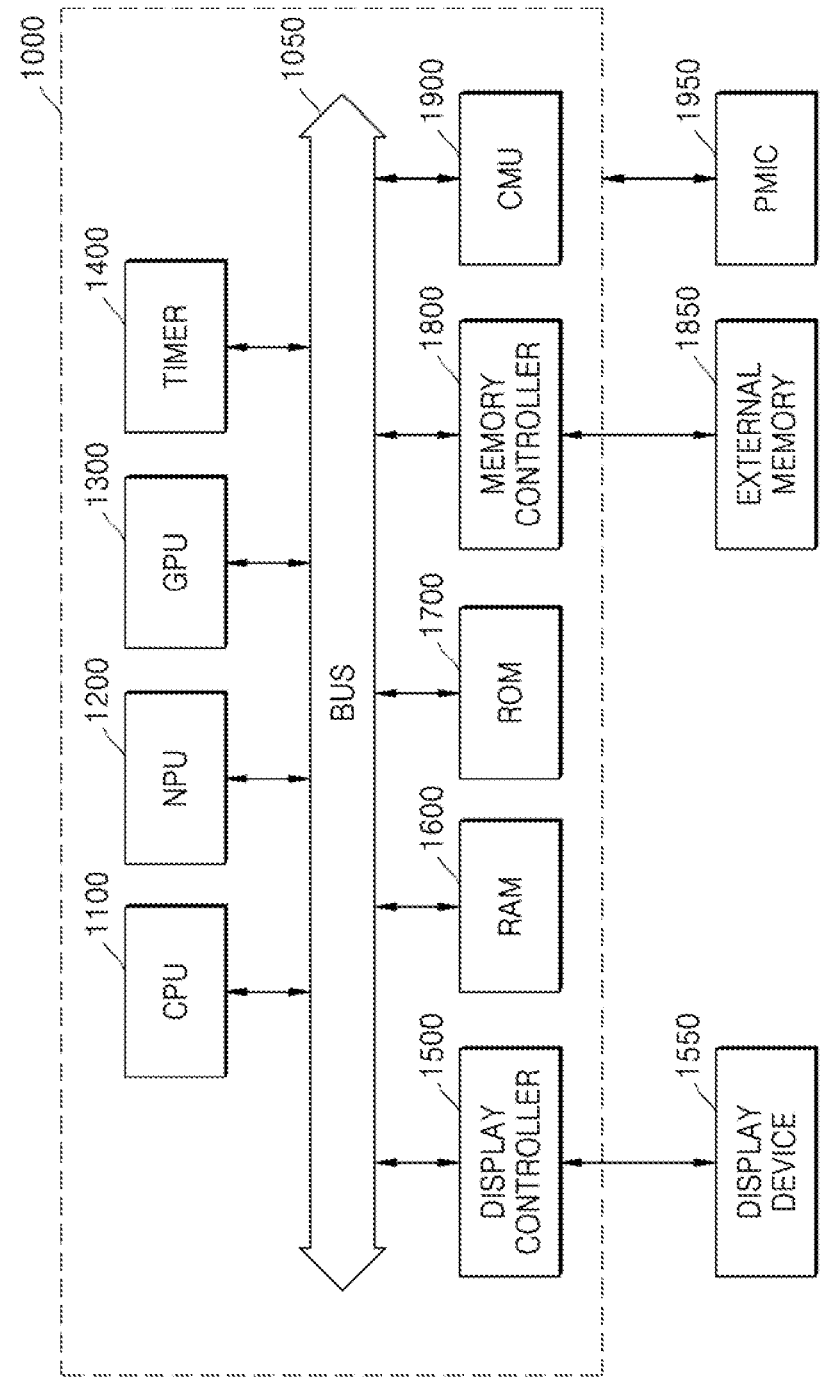
FIG. 10 is a block diagram illustrating an electronic device according to another example embodiment.

FIG. 10 is a block diagram illustrating an electronic device 30 according to another example embodiment.

Referring to FIG. 10, the electronic device 30 may be implemented as a handheld device such as a mobile phone, a smartphone, a tablet personal computer (PC), a personal digital assistant (PDA), an enterprise digital assistant (EDA), a digital still camera, a digital video camera, a portable multimedia player (PMP), a personal navigation device, or a portable navigation device (PND), handheld game console, or e-book.

The electronic device 30 may include an SOC 1000, an external memory 1850, a display device 1550, and a PMIC 1950.

The SOC 1000 may include a central processing unit (CPU) 1100, a neural processing unit (NPU) 1200, a graphics processing unit (GPU) 1300, a timer 1400, a display controller 1500, a random access memory (RAM) 1600, a read only memory (ROM) 1700, a memory controller 1800, a clock management unit (CMU) 1900, and a bus 1050. The SOC 1000 may further include other components in addition to the illustrated components. For example, the electronic device 30 may further include the display device 1550, the external memory 1850, and the PMIC 1950. The PMIC 1950 may be implemented outside the SOC 1000. In another implementation, the SOC 1000 may include a power management unit (PMU) capable of performing a function of the PMIC 1950.

The CPU 1100 may also be called a processor, and may process or execute programs and/or data stored in the external memory 1850. For example, the CPU 1100 may process or execute programs and/or data in response to an operation clock signal output from the CMU 1900.

The CPU 1100 may be implemented as a multi-core processor. The multi-core processor may be a single computing component having two or more independent substantive processors (called 'cores'), each of which may read and execute program instructions. Programs and/or data stored in the ROM 1700, the RAM 1600, and/or the external memory 1850 may be loaded into a memory (not shown) of the CPU 1100 as needed.

The NPU 1200 may efficiently process a large-scale operation using an artificial neural network. The NPU 1200 may perform deep learning by supporting multiple simultaneous matrix operations.

The GPU 1300 may convert data, read from the external memory 1850 by the memory controller 1800, into a signal suitable for the display device 1550.

The timer 1400 may output a count value indicating time based on an operation clock signal output from the CMU 1900.

The display device 1550 may display image signals output from the display controller 1500. The display device 1550 may be implemented as, e.g., a liquid crystal display (LCD), a light emitting diode (LED) display, an organic LED (OLED) display, an active-matrix OLED (AMOLED) display, or a flexible display. The display controller 1500 may control an operation of the display device 1550.

The RAM 1600 may temporarily store programs, data, or instructions. For example, the programs and/or data stored in the external memory 1850 may be temporarily stored in the RAM 1600 under the control of the CPU 1100 or according to a booting code stored in the ROM 1700. The RAM 1600 may be implemented as a dynamic RAM (DRAM) or a static RAM (SRAM).

The ROM 1700 may store persistent programs and/or data. The ROM 1700 may be implemented as an erasable programmable read-only memory (EPROM) or an electrically erasable programmable read-only memory (EEPROM).

The memory controller 1800 may communicate with the external memory 1850 through an interface. The memory controller 1800 generally controls an operation of the external memory 1850 and controls data exchange between a host and the external memory 1850. For example, the memory controller 1800 may write data to or read data from the external memory 1850 according to a request from the host. Here, the host may be a master device such as the CPU 1100, the GPU 1300, or the display controller 1500.

The external memory 1850, which is a storage medium for storing data, may store an operating system (OS), various programs, and/or various data. The external memory 1850 may be, e.g., a DRAM, or a NVM device (e.g., a flash memory, a phase change RAM (PRAM), a magnetic RAM (MRAM), a resistive RAM (RRAM), or a ferroelectric RAM (FeRAM) device). In another example embodiment, the external memory 1850 may be an internal memory provided inside the SOC 1000. Also, the external memory 1850 may be a flash memory, an embedded multimedia card (eMMC), or a universal flash storage (UFS).

The CMU 1900 generates an operation clock signal. The CMU 1900 may include a clock signal generating device such as a phase locked loop (PLL), a delayed locked loop (DLL), or a crystal oscillator.

The operation clock signal may be supplied to the GPU 1300. The operation clock signal may also be supplied to another component (e.g., the CPU 1100 or the memory controller 1800). The CMU 1900 may change a frequency of the operation clock signal.

The CPU 1100, NPU 1200, GPU 1300, timer 1400, display controller 1500, RAM 1600, ROM 1700, memory controller 1800, and CMU 1900 may communicate with each other through the bus 1050.

Figure 11:
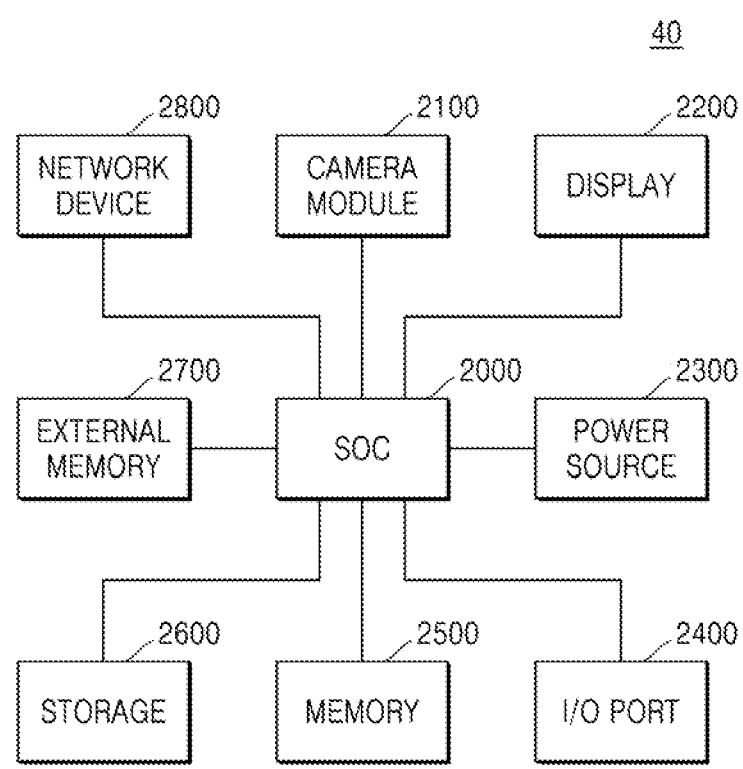
FIG. 11 is a block diagram illustrating an electronic device according to another example embodiment.

FIG. 11 is a block diagram illustrating an electronic device 40 according to another example embodiment.

Referring to FIG. 11, the electronic device 40 may be implemented as a personal computer (PC), a data server, or a portable electronic device.

The electronic device 40 may include an SOC 2000, a camera module 2100, a display 2200, a power source 2300, an input/output (I/O) port 2400, a memory 2500, a storage 2600, an external memory 2700, and a network device 2800.

The camera module 2100 refers to a module capable of converting an optical image into an electrical image. The electrical image output from the camera module 2100 may be stored in the storage 2600, the memory 2500, or the external memory 2700. Also, the electrical image output from the camera module 2100 may be displayed on the display 2200.

The display 2200 may display data output from the storage 2600, the memory 2500, the I/O port 2400, the external memory 2700, or the network device 2800. The display 2200 may include the display device 1550 shown in FIG. 10.

The power source 2300 may supply an operating voltage to at least one of the components. The power source 2300 may be controlled by the PMIC 1950 shown in FIG. 10.

The I/O port 2400 refers to ports capable of transmitting data to the electronic device 40 or data output from the electronic device 40 to an external device. For example, the I/O port 2400 may include a port for connecting a pointing device such as a computer mouse, a port for connecting a printer, or a port for connecting a USB drive.

The memory 2500 may be implemented as a volatile memory or an NVM. According to an example embodiment, a memory controller capable of controlling a data access operation, e.g., a read operation, a write operation (or a program operation), or an erase operation with respect to the memory 2500, may be integrated or embedded in the SOC 2000. According to another example embodiment, the memory controller may be implemented between the SOC 2000 and the memory 2500.

The storage 2600 may be implemented as a hard disk drive or a solid state drive (SSD).

The external memory 2700 may be implemented as a secure digital (SD) card or a multimedia card (MMC). According to an example embodiment, the external memory 2700 may include a subscriber identification module (SIM) card or a universal subscriber identity module (USIM) card.

The network device 2800 refers to a device capable of connecting the electronic device 40 to a wired network or a wireless network.

As described above, embodiments may provide an electronic device that processes data requiring security without activating a main processor when operating in a low power mode.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. An electronic device selectively operable in a normal mode and a low power mode, the electronic device comprising:
   a first non-volatile memory (NVM) including a security region in which security data is stored and a non-security region in which data different from the security data is stored;
   a security device including a second NVM, a second memory controller connected to the second NVM, and a memory processor connected to the second memory controller; and
   a system on chip (SOC) connected to the first NVM through a communication channel and the security device through a security channel, the SOC including:
   a main processor:
   a first memory controller connected to the first NVM through the communication channel and the main processor through a bus; and
   a security processor connected to the main processor and the first memory controller through the bus, and the security processor configured to:
   generate a write request signal and first security data,
   provide the write request signal and the first security data to the main processor of the SOC in the normal mode,
   provide the write request signal and the first security data to the memory processor of the security device in the low power mode, and
   in the normal mode, store the first security data in the security region of the first NVM in response to the write request signal and the first security data being provided to the main processor of the SOC, and store the first security data in the second NVM in response to the write request signal and the first security data being provided to the memory processor of the security device,
   wherein the data stored in the non-security region includes a program image and the security data stored in the security region includes an identifier of the program image.

2. The electronic device as claimed in claim 1, wherein:
   the main processor is configured to output a first control command instructing to store the first security data, in response to the write request signal output from the security processor;
   the first memory controller is configured to provide a first program command, a first address, and the first security data to the first NVM through the communication channel in response to the first control command; and
   a state manager configured to output a power flag indicating a power supply state of the SOC corresponding to the normal mode.

3. The electronic device as claimed in claim 2, wherein the security processor includes:
   a state register configured to store the power flag;
   an internal memory configured to temporarily store the first security data; and
   a processing core configured to output, to the main processor, based on a result of monitoring the power flag stored in the state register, the write request signal requesting to store the temporarily stored first security data.

4. The electronic device as claimed in claim 3, wherein:
   the internal memory is configured to temporarily store the first security data before a mode of the electronic device is switched from the low power mode to the normal mode, and
   the processing core is configured to output the write request signal and the temporarily stored first security data after the mode of the electronic device is switched from the low power mode to the normal mode.

5. The electronic device as claimed in claim 2, wherein:
   the security processor is configured to perform a security operation in the normal mode to generate second security data, and provide the second security data and the write request signal to the main processor,
   the main processor is configured to provide a second control command instructing to store the second security data to the first memory controller, in response to the write request signal, and
   the first memory controller is configured to provide a second program command, a second address, and the second security data to the first NVM, in response to the second control command.

6. The electronic device as claimed in claim 2, wherein:
   the security processor is configured to provide a read request signal to the main processor in the normal mode,
   the main processor is configured to provide a second control command instructing to read the first security data to the first memory controller, in response to the read request signal, and
   the first memory controller is configured to provide a read command and the first address to the first NVM, in response to the second control command.

7. The electronic device as claimed in claim 2, further comprising:
   a power controller configured to supply power to the first NVM, the security device, the security processor, the main processor, the first memory controller, and the state manager in the normal mode, and supply power to the security device and the security processor in the low power mode.

8. The electronic device as claimed in claim 7, wherein:
   the first NVM, the main processor, and the first memory controller are configured to be deactivated in the low power mode when an operation of the electronic device is switched from the normal mode to the low power mode, and
   the security processor is configured to access the second NVM in the low power mode.

9. The electronic device as claimed in claim 1, wherein the security processor is configured to perform a security operation in the normal mode to generate second security data, and access the second NVM to store the second security data in the second NVM.

10. The electronic device as claimed in claim 1, wherein a storage capacity of the second NVM is less than a storage capacity of the first NVM.

11. An electronic device selectively operable in a normal mode and a low power mode, the electronic device comprising:
   a first non-volatile memory (NVM) including a security region in which security data is stored and a non-security region in which data different from the security data is stored;
   a security device including a second NVM, a second memory controller connected to the second NVM, and a memory processor connected to the second memory controller;
   a security processing module connected to the security device through a security channel, and configured to:
   generate a first write request signal and first security data, in the normal mode, store the first security data in the security region of the first NVM and store the first security data in the second NVM: and
   a system on chip (SOC) connected between the first NVM and the security processing module through a communication channel, and the SOC including:
   a main processor; and
   a first memory controller connected to the first NVM through the communication channel and the main processor through a bus, and the first memory controller configured to provide the first security data, a first program command, and a first address to the first NVM in response to the first write request signal,
   wherein, in the normal mode, the security processing module is configured to store the first security data in the security region of the first NVM in response to the main processor of the SOC being activated, and store the first security data in the second NVM in response to the memory processor of the security device being activated, and
   wherein the data stored in the non-security region includes a program image and the security data stored in the security region includes an identifier of the program image.

12. The electronic device as claimed in claim 11, wherein the SOC further includes:
   a state manager configured to output a power flag indicating a power supply state of the SOC corresponding to the normal mode,
   wherein the main processor is configured to output a control command instructing to store the first security data in response to the first write request signal; and
   wherein the first memory controller is configured to communicate with the first NVM through the communication channel, and provide the first program command, the first address, and the first security data to the first NVM in response to the control command.

13. The electronic device as claimed in claim 12, wherein the security processing module includes:
   a state register configured to store the power flag;
   an internal memory configured to temporarily store the first security data; and
   a processing core configured to output, to the main processor, the first write request signal and the temporarily stored first security data, based on a result of monitoring the power flag stored in the state register.

14. The electronic device as claimed in claim 11, wherein:
   the security processing module is configured to perform a security operation in the normal mode to generate second security data, and provide the second security data and a second write request signal to the SOC, and
   the SOC is configured to provide the second security data, a second program command, and a second address to the first NVM, in response to the second write request signal.

15. The electronic device as claimed in claim 11, wherein the security processing module is configured to perform a security operation in the normal mode to generate second security data and access the second NVM to store the second security data in the second NVM.

16. The electronic device as claimed in claim 11, further comprising:
   a power controller configured to supply power to the first NVM, the security device, the security processing module, and the SOC, in the normal mode, and supply power to the security device and the security processing module in the low power mode.

17. The electronic device as claimed in claim 16, wherein:
   the first NVM and the SOC are configured to be deactivated in the low power mode when an operation of the electronic device is switched from the normal mode to the low power mode, and
   the security processing module is configured to access the second NVM in the low power mode.

18. An electronic device selectively operable in a normal mode and a low power mode, the electronic device comprising:
   a first non-volatile memory (NVM) including a security region in which security data is stored and a non-security region in which data different from the security data is stored;
   a security device including a second NVM, a second memory controller connected to the second NVM, and a memory processor connected to the second memory controller;
   a system on chip (SOC) connected to the first NVM through a communication channel and the security device through a security channel, the SOC including:
   a main processor;
   a first memory controller connected to the first NVM through the communication channel and the main processor through a bus;
   a security processor connected to the main processor and the first memory controller through the bus, and the security processor configured to:
   generate a first write request signal and first security data
   output the first write request signal and the first security data to the main processor of the SOC in the normal mode, and
   output the first write request signal and the first security data to the memory processor of the security device in the low power mode, and
   in the normal mode, store the first security data in the security region of the first NVM in response to the first write request signal and the first security data being output to the main processor of the SOC, and store the first security data in the second NVM in response to the first write request signal and the first security data being output to the memory processor of the security device; and
   a power controller configured to supply power to the first NVM, the security device, and the SOC in the normal mode, and supply power to the security device and the security processor in the low power mode, wherein the main processor is configured to output a control command in response to the first write request signal, wherein the first memory controller is configured to output a program command, an address, and the first security data to the first NVM in response to the control command, and wherein the data stored in the non-security region includes a program image and the security data stored in the security region includes an identifier of the program image.

19. The electronic device as claimed in claim 18, wherein:

the second memory controller is configured to control the second NVM, the memory processor is configured to communicate with the security processor to control the second memory controller, and the security processor is configured to perform a security operation in the normal mode to generate second security data, and output a second write request signal requesting to store the second security data to the main processor and output the second write request signal to the memory processor, according to characteristics of the second security data.

20. The electronic device as claimed in claim 18, wherein the first NVM, the main processor, and the first memory controller are configured to be deactivated in the low power mode when an operation of the electronic device is switched from the normal mode to the low power mode, and wherein the security processor is configured to access the second NVM in the low power mode.

* * * * *